(No Model.) 2 Sheets—Sheet 1.
E. WILSON.
AUTOMATIC WATER REGULATOR FOR WASHING MACHINES.
No. 567,729. Patented Sept. 15, 1896.
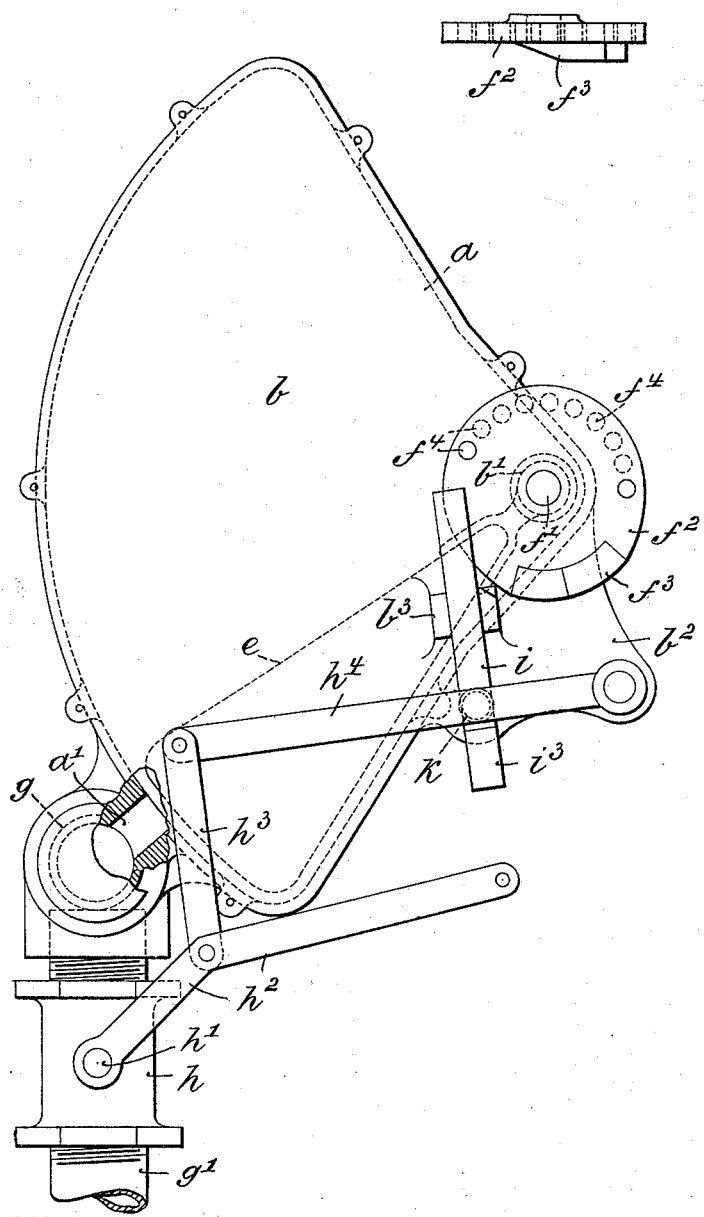
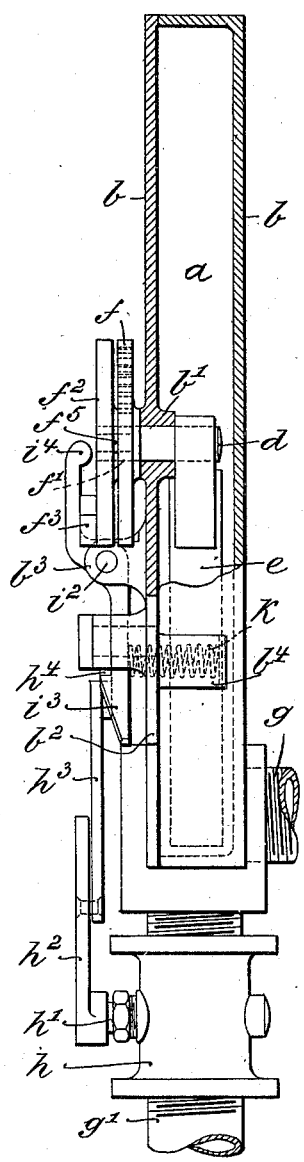
Witnesses
Thomas M. Smith
Richard C. Maxwell
Inventor:
Edgar Wilson,
By J. Walter Douglass
Attorney.

(No Model.) 2 Sheets—Sheet 2.
E. WILSON.
AUTOMATIC WATER REGULATOR FOR WASHING MACHINES.
No. 567,729. Patented Sept. 15, 1896.
Fig. 3. Fig. 4.
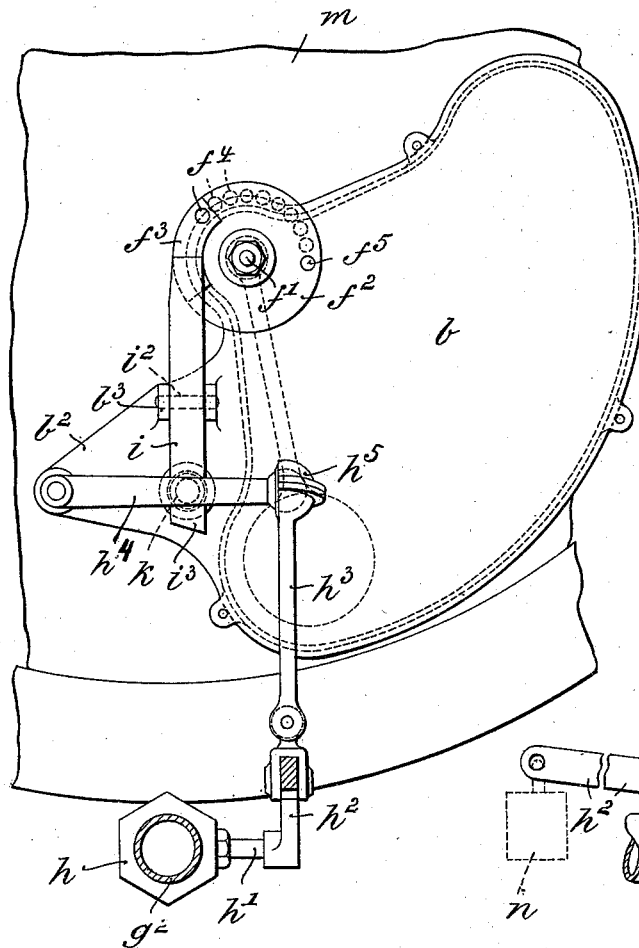
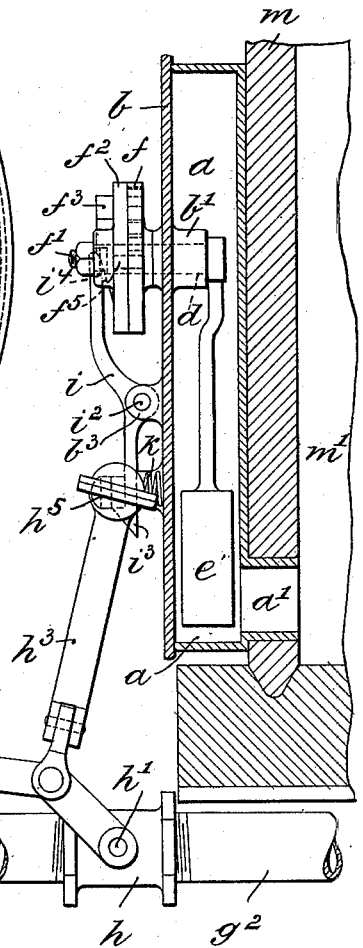
Fig. 6.
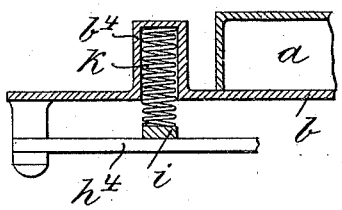
Witnesses:
Thomas M. Smith.
Richard C. Maxwell.
Inventor:
Edgar Wilson,
By J. Walter Douglass
Attorney.
THE NORRIS PETERS CO., PHOTO-LITHO., WASHINGTON, D. C.

UNITED STATES PATENT OFFICE.

EDGAR WILSON, OF PHILADELPHIA, PENNSYLVANIA.

AUTOMATIC WATER-REGULATOR FOR WASHING-MACHINES.

SPECIFICATION forming part of Letters Patent No. 567,729, dated September 15, 1896.

Application filed December 12, 1895. Serial No. 571,845. (No model.)

*To all whom it may concern:*

Be it known that I, EDGAR WILSON, a citizen of the United States, residing at the city of Philadelphia, in the county of Philadelphia and State of Pennsylvania, have invented certain new and useful Improvements in Automatic Water-Regulators for Washing-Machines, of which the following is a specification.

My invention has relation to an automatic water-regulator for washing-machines or the like, in which, when the water reaches a predetermined height in the machine or receptacle, it is automatically shut off; and in such connection the invention relates particularly to the construction and arrangement of such an automatic water-regulator.

The principal objects of my invention are, first, to provide a regulator for washing-machines or the like adapted to automatically shut off the supply of water to the machine or receptacle when the water has reached a predetermined height therein; second, to provide in such a regulator a float suspended in a compartment wherein the water enters to a height corresponding to the height of the water in the machine or receptacle, a cam operated by said float, a latch operated by the cam, and a lever adapted to be released when said latch is actuated, to thereby shut off the valve in the water-supply pipe of the machine or receptacle; and, third, to provide in such a regulator means for adjusting the position of the cam with respect to the latch, so that the release of the latch may be varied according to variations in the movement of the float actuating the cam.

My invention, stated in general terms, consists of a regulator adapted to automatically shut off the water-supply to a washing-machine or the like when the water has reached a predetermined height, constructed and arranged in substantially the manner hereinafter described and claimed.

The nature and scope of my invention will be more fully understood from the following description, taken in connection with the accompanying drawings, forming part hereof, and in which—

Figure 1 is a side elevation, partly broken away, of a regulator located in connection with the water-supply pipe leading to a washing-machine or similar receptacle embodying features of my invention, and illustrating the construction and arrangement of the cam, the float actuating the same, the latch adapted to be operated by the cam, and the levers held in inoperative position by the latch and adapted when released to operate the valve in the supply-pipe. Fig. 2 is an end elevation, partly sectioned, of the regulator illustrated in Fig. 1. Fig. 3 is a side elevation of a modified form of the regulator, showing the same secured to the end of a washing-machine and in open communication with the interior thereof. Fig. 4 is an end elevation, partly sectioned, of Fig. 3. Fig. 5 is an edge view of the cam detached from the float, and Fig. 6 is an end elevation partly sectioned and enlarged to illustrate in detail the latch and the spring controlling the same.

Referring to the drawings, $a$ represents a suitable water-tight compartment inclosed by a casing $b$, in the front wall of which is formed a bearing $b'$ for a short shaft or pin $d$. Suitably secured to one end of the shaft $d$, and within the compartment $a$, is a float $e$. Outside the casing $b$, and carried by the shaft $d$, is provided a disk $f$ upon a stud $f'$, which is loosely secured to a disk $f^2$, having a cam projection $f^3$, as illustrated in detail in Figs. 1 and 5. Each of the disks $f$ and $f^2$ is provided with a series of openings $f^4$, arranged near the periphery of said disks and registering with each other. The two disks are preferably secured to each other by means of a pin $f^5$, passing through two openings registering with each other. The compartment $a$ is provided with an inlet $a'$ for water.

In the form illustrated in Figs. 1 and 2 the casing $b$ is supported directly on a supply-pipe $g$, conveying water to the main compartment of a washing-machine or other suitable receptacle. The inlet $a'$ in this form is formed between the compartment $a$ and the pipe $g$, as indicated in Fig. 1. In Figs. 1 and 2 the valve $h$, controlling the inlet of water to the supply-pipe $g$, is arranged in a vertical pipe $g'$, and is known technically as a "butterfly-valve." The stem $h'$ of the valve $h$ is connected to one end of a bent or angle lever $h^2$, the angle of which is pivotally connected to one end of a link $h^3$. The other end of this link $h^3$ is pivotally connected to the free end of an arm $h^4$, which is pivoted at its other end in a bracket or extension $b^2$ of the casing $b$. The arm $h^4$, link $h^3$, and angle-lever $h^2$ are normally held in an upright position, as illustrated in Fig. 1, by means of a latch or catch $i$, pivoted at about its middle, as at $i^2$, in a bracket or extension $b^3$. One end of this latch or catch $i$ is provided with a beveled hook $i^3$, upon which the edge of the arm $h^4$ rests. The outer end of the catch $i$ is preferably provided with a projection $i^4$, arranged in the path of the cam projection $f^3$ of the disk $f^2$. Between the point of pivotal support $i^2$ and the hook $i^3$ a spring $k$ is located in a box or recess $b^4$ of the casing $b$, one end of this spring bearing against the floor of the box $b^4$, while the other end bears against the catch $i$ and is adapted to normally press its hook $i^3$ under the arm $h^4$. The cam $f^3$ as it passes under the projection $i^4$ is adapted to depress the hook $i^3$ out of engagement with the arm $h^4$. In the form illustrated in Figs. 3 and 4 the casing $b$ is secured directly to the wall $m$ of the washing-machine $m'$, and the inlet $a'$ pierces the wall $m$ and opens communication between the compartment $a$ and the interior of the washing-machine $m'$, as shown in Fig. 4 of the drawings. The valve $h$ in this latter form is also a butterfly-valve, but is arranged on a horizontal supply-pipe $g^2$. The angle-lever $h^2$ is connected by a forked arm to the corresponding end of a link $h^3$, having at its other end a universal-joint connection $h^5$ with the arm $h^4$. In this form the construction and arrangement of the catch and cam-disk are precisely the same as in the form illustrated in Figs. 1 and 2. The float $e$ may be either trapezoidal, as shown in Figs. 1 and 2, cylindrical or spherical, as shown in Figs. 3 and 4, the casing $b$, of course, being somewhat differently shaped to accord with the shape of the float and the distance it has to travel.

In operation the cam-disk $f^2$ is adjusted by means of the pins $f^5$ and openings $f^4$ with respect to the disk $f$, so that the cam projection $f^3$ will rest under the catch $i$ when the float $e$ has reached a predetermined height. As water enters the compartment $a$ and the washing-machine the float $e$ is gradually elevated and the two disks $f$ and $f^2$ turned until the float $e$ reaches its predetermined highest position, when the cam projection $f^3$ will abut against the projection $i^4$ of the catch $i$ and depress the hook $i^3$ out of engagement with the arm $h^4$. Immediately the arm $h^4$, through its connections with the lever $h^2$, and by reason of the weight thereof, will drop and operate the stem $h'$ to close the valve $h$, thus preventing a further flow of water into the washing-machine. To turn on the water and to restore all parts to their normal positions, as illustrated in the drawings, the lever $h^2$ is raised, and through the connections the arm $h^4$ is brought up into engagement with the hook $i^3$ of the catch $i$.

To facilitate the dropping of the lever $h^2$, a weight $n$ may be secured to its free end, as indicated in dotted lines in Fig. 4 of the drawings.

Having thus described the nature and objects of my invention, what I claim as new, and desire to secure by Letters Patent, is—

1. In an automatic regulator for washing-machines or the like, a compartment in communication with a water supply to the machine, a float suspended in said compartment, a shaft operated directly by said float, a disk operated directly by said shaft, a cam projecting from said disk and carried thereby, a latch actuated by said cam, and means controlled by said latch for shutting off the supply of water to the machine, substantially as and for the purposes described.

2. In an automatic regulator for washing-machines or the like, a compartment supported upon and in communication with the main water supply to the machine, a float suspended in said compartment, a disk rotated by the movement of said float, a cam-disk, means for adjustably securing said disk to the one operated by said float, a latch adapted to be released by the movement of the cam-disk, an arm adapted to be released from engagement with said latch, a link and angle-lever operated by said arm and a valve operated through its stem by said lever and adapted to shut off the water-supply, substantially as and for the purposes described.

In testimony whereof I have hereunto set my signature in the presence of two subscribing witnesses.

EDGAR WILSON.

Witnesses:
J. WALTER DOUGLASS,
THOMAS M. SMITH.